Patented June 24, 1952

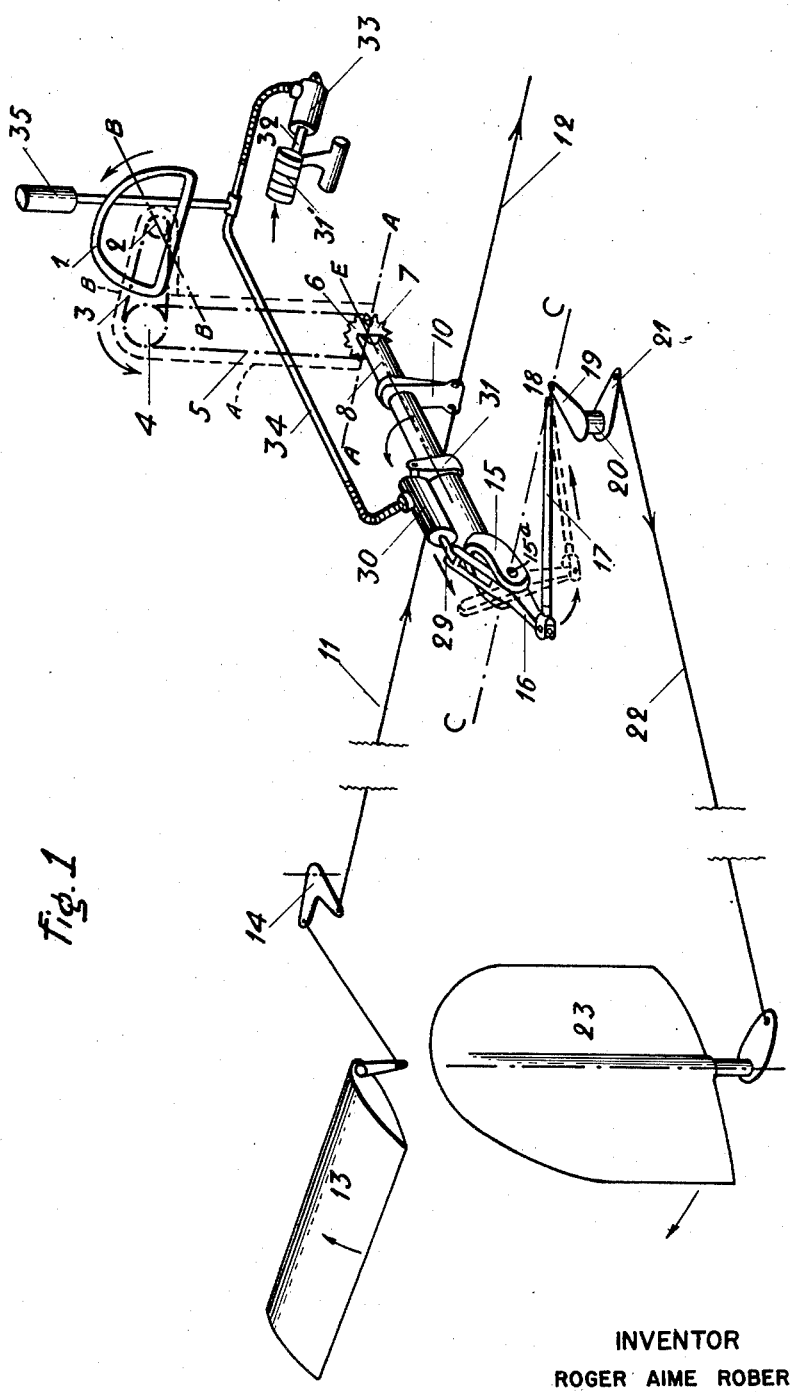

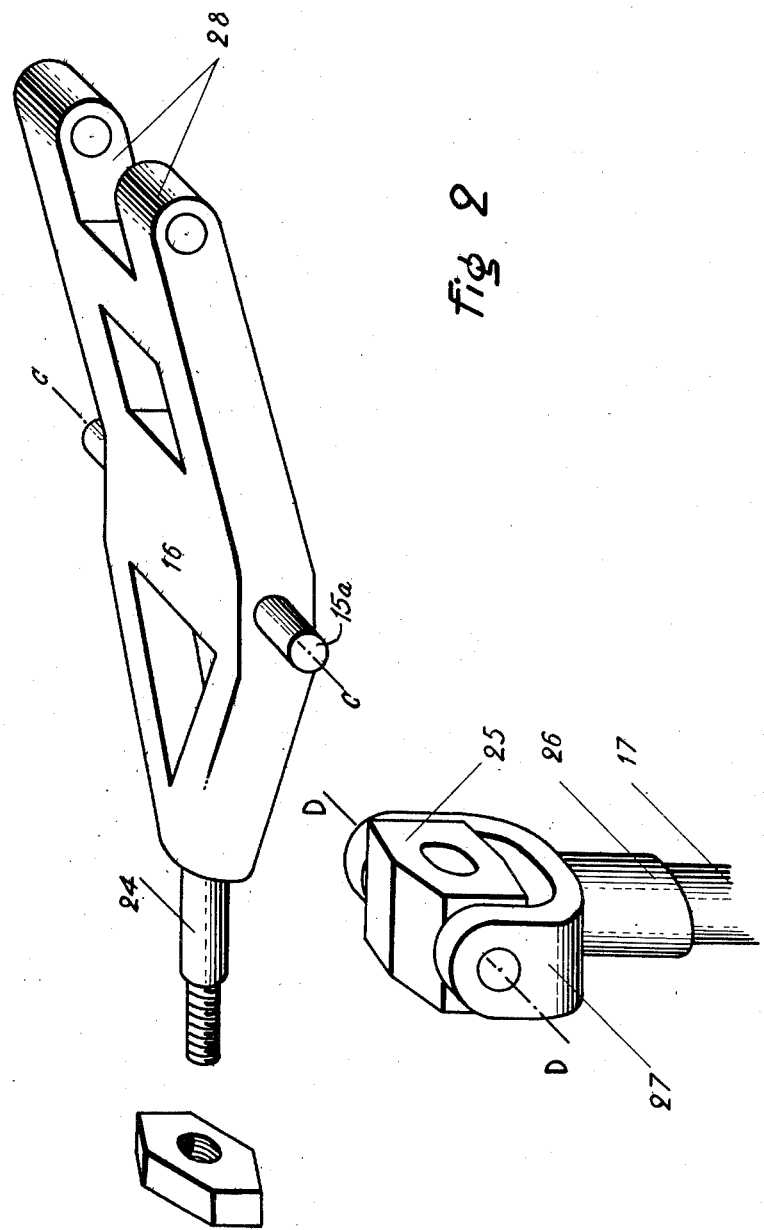

2,601,458

UNITED STATES PATENT OFFICE 2,601,458

AIRCRAFT CONTROL MECHANISM

Roger Aime Robert, Boulogne-sur-Seine, France

Application December 15, 1945, Serial No. 635,309
In France May 15, 1943

Section 1, Public Law 690, August 8, 1946
Patent expires May 15, 1963

11 Claims. (Cl. 244—83)

1

The ordinary way to control an aircraft is as follows: The pilot handles a lever called a joystick, which when pushed forward or backward, controls the horizontal elevators, and which when pushed to the left or to the right, controls the warping by deflection of the ailerons disposed at the trailing edge of the wings. This latter control may be done by rotating a hand wheel placed on this lever. Finally, through a rudder bar or two pedals, the pilot controls the deflection of the movable vertical tail-fin unit. Such a way of piloting presents well known difficulties of training and the slightest error may result in fatal consequences.

Many devices have already been proposed with a view to simplifying this system of control. One of them consists in combining the controls of the ailerons and of the rudder, so that the rotation of the control wheel, or the lateral motion of the stick, causes simultaneously the deflection of the ailerons, and a corelated deflection of the rudder; thus is removed the necessity of the rudder bar or of the pedals. This way of piloting nevertheless presents some drawbacks whose major one is the following: if, during a flight in windy atmosphere, a gust of wind raises one of the wings, the deflection of the ailerons required in order to restore the normal horizontal position of the plane, carries along a deflection of the rudder; the flight of the plane ceases then to be linear and becomes sinuous.

The device according to the invention aims to improving the piloting of aircraft by avoiding these drawbacks. The improved control system of the invention is obtained by means of a joystick or a control wheel, as usual, and of a pedal. As long as the pilot does not operate the pedal, the handling of the control wheel results only in the deflection of the ailerons, the rudder retaining its neutral position and being locked in this position. In these conditions which correspond to those of normal flight, the airplane is piloted in the same way as an automobile, simply by rotation of the control wheel, as long as the flight takes place in an horizontal plane. If, on the contrary, the pilot presses on the pedal, he will, in this way, establish a temporary connection between the control of the ailerons and that of the rudder, so that, by rotation of the control wheel, deflection of the rudder is caused in addition to that of the ailerons. Furthermore, according to the invention, the relative amplitudes of deflection of the ailerons and that of the rudder respectively depend on the degree of depression of the pedal.

2

The following description refers to an embodiment, selected as an example, of a control system for piloting an airplane organized according to the invention. Reference is made to the annexed drawing in which:

Fig. 1 is a perspective view, showing diagrammatically the system of the invention.

Fig. 2 is a perspective view of details thereof.

The usual joy-stick or post A, shown in broken lines, is mounted for pivotal movement about a transverse axis A—A. On this post A, preferably at the outer extremity of a lateral arm B, a control wheel is mounted for pivotal rotation about a fore-and-aft axis B—B. The control wheel 1, which acts on the ailerons 13, has a pinion 2 coaxial therewith which, through a chain 3, drives a double pinion 4. A chain 5 connects the pinion 4 to a pinion 6 which, through a universal joint 7, transmits the movement of rotation of the pinion 4 to a main control shaft 8 journalled in bearings (not shown) supported on the aircraft frame. One of the axes of the universal joint 7 coincides with axis A—A.

A crank lever 10 extends from the shaft 8 and is connected by push-pull rods 11 and 12 to ailerons 13 through a bell-crank lever 14. The shaft 8 ends towards the rear in a fork 15, to which a lever 16 is pivoted, about a transverse axis C—C, by means of a cross-pin 15a. On this lever 16 is hinged a rod 17, the other end 18 of which in line with said axis C—C, is linked to the arm 19 of a bell-crank lever 20. The other arm 21 of said bell-crank lever 20 is connected through a rod 22 to the rudder 23. The hinge connection between lever 16 and rod 17 is shown on a larger scale on Fig. 2. The lever 16 ends in a cylindrical part 24, on which a rotating sleeve 25 is mounted. The rod 17 ends in a connecting rotative part 26, the forked end 27 of which is pivoted on the sleeve 25 about an axis D—D. The opposite end 28 of the lever 16 is linked to the piston rod 29 of a jack 30 pivotally attached to a collar 31 rigid with shaft 8. The jack 30 is put in operative or inoperative condition by means of a pedal 31', acting directly on the piston rod 32 of a master cylinder 33. In the hydraulic connection 34 between the master cylinder 33 and the jack 30 is provided a tank of liquid 35.

When pedal 31' is not actuated, the lever 16 is held in such a position, for example by means of a spring, not shown, that its cylindrical part 24 is disposed along the axis E—E on the shaft 8. Rotation of this shaft does not lead then to a movement of the rod 17. Upon rotating the wheel 1, causing the warping of the ailerons 13, the rudder 23 remains locked in its neutral position, any reaction issuing from the rudder 23 being applied on the lever 16 in a plane containing the axis of rotation of this lever.

If pedal 31' is actuated, the jack 30 pivots the lever 16 around the axis C—C; the rear end of this lever moves along an arc of a circle and rod 17 describes a cone whose summit is the point 18 and whose base is precisely limited by the arc of a circle above mentioned; merely by pushing on pedal 31', the wheel 1 being in its neutral position, no deflection of the rudder 23 occurs; on the contrary, if, simultaneously, the pedal 31' is depressed and the wheel 1 is rotated out of its neutral position, the shaft 8 rotates around the axis E—E and the end of the lever 16, which is the sleeve 25, rotates around said axis, point 18 being then moved, which results in the deflection of the rudder. Fig. 1 shows in full lines the position of the lever 16 and that of the rod 17 for the non-operative position of the pedal 31'; in dotted line is shown the position for the maximum depression of the pedal and for the neutral position of the wheel 1. When, by pushing on the pedal 31', the rudder 23 is conditioned to move with the ailerons 13, the angle of rotation of the wheel 1 causes a corresponding deflection of the rudder 23 whose magnitude depends on the degree of depression of the pedal.

When applied to aircraft with tricycle landing gears, the invention provides thus means for establishing a mechanical connection between the control of the direction of the nose wheel and the control of the deflection of the ailerons 13. In taxiing the pilot is then able, at will, to control the movements of the aircraft on the ground either by deflection of the ailerons or by pushing on the pedal thus controlling simultaneously by said deflection and by the orientation of the front wheel.

Having now described my invention, what I claim is:

1. In a control system for airplanes: ailerons; a rudder; a control member to operate the ailerons; a mechanical connection between said control member and the ailerons, said mechanical connection including a rotating shaft, coupling means between the rudder and said rotating shaft, said coupling means comprising a lever, a cross-pin on said lever to articulate it to said shaft, and pedal-controlled means to maintain part of said lever in the extension of the axis of said rotating shaft so as to render idle the interconnection between the control member and the rudder when the interlocking of the rudder to the ailerons is not desirable.

2. In a control system for airplanes: ailerons; a rudder; a control member to operate the ailerons; a mechanical connection between said control member and the ailerons, said mechanical connection including a rotating shaft; coupling means between the rudder and said rotating shaft, said coupling means comprising a lever pivoted on said shaft about an axis transverse to the axis of said shaft; pedal-controlled hydraulic means to maintain a branch of said lever in the extension of the axis of said rotating shaft so as to render idle the interconnection between the rudder and the control member when the interlocking of the rudder to the ailerons is not desirable; a bell-crank having two arms, connecting means between the rudder and one of said arms, a universally jointed linkage between the other arm and said branch of the lever.

3. In a control system for airplanes: ailerons; a rudder; a control member to operate the ailerons; a mechanical connection between said operating member and the ailerons; said mechanical connection including a rotating shaft; coupling means between the rudder and said rotating shaft; said coupling means comprising a lever, a cross-pin on said lever to articulate it to said rotating shaft and a linkage normally idly operated by said lever from a point located in the axis of said rotating shaft; and means to tilt said lever on its pivot pin over an angle determining the adjustment of the interlocking of the rudder with the ailerons.

4. In a control system for airplanes: ailerons; a rudder; a control member to operate the ailerons; a mechanical connection between said operating member and the ailerons, said mechanical connection including a rotating shaft; coupling means between the said mechanical connection and the rudder comprising a lever, a cross-pin on said lever to pivot it to said rotating shaft, means comprising an hydraulic jack to maintain a branch of said lever in the extension of the axis of said rotating shaft, when the interlocking of the rudder to said operating member is not desired and to tilt the lever on its pivot pin over an angle determining the adjustment of the interlocking of the rudder to the said operating member when this interlocking is desired.

5. Control system according to claim 2, in which the connection between the universally jointed linkage and the other arm of the bellcrank is on the pivoting axis of said lever when the rudder is in its mid-position.

6. In an aircraft control system, ailerons, a rudder, a first control member operable in either direction from a neutral position; transmission means from said control member to said ailerons; second transmission means from said control member to said rudder comprising rigid variable-ratio transmission means variable from zero to a maximum, a second control member operable in only one direction from its neutral position and third transmission means from said second control member to said variable ratio transmission means adapted to bring said variable ratio transmission means from its zero-ratio condition for the neutral position of said second control member gradually to its maximum ratio condition for the maximum deviation of said second control member away from its neutral position.

7. Control system as in claim 6, wherein said variable ratio transmission means is irreversible.

8. In a flight-control system for an airplane including an aileron at each wing-tip and a steering rudder: a shaft rotatable in either direction, means for actuating said shaft, first transmission means from said shaft to the ailerons for controlling their setting in either direction depending on the sense of rotation of the shaft, an arm mounted on one end of said shaft for pivoting movement about an axis transverse of the shaft, means for controlling the pivotal movement of said arm from a position of alignment with said shaft to a position of maximum deviation therefrom, and second transmission means from said arm to the steering rudder.

9. System as in claim 8, wherein said second transmission means comprise a link hinged at one end to said arm, and having its other end substantially in alignment with the pivoting axis of said arm when said actuating means is in neutral position.

10. Flight-control system for an airplane comprising ailerons, a rudder, a first actuating member operable in either direction from its neutral position, first transmission means from said member to the ailerons for setting the ailerons for rolling control, second transmission means derived from said first transmission means controlling the rudder and comprising a rigid variable-ratio transmission means adjustable from the zero value of the variable ratio, a second actuating member independent from said first actuating member and operatively connected to said variable-ratio transmission means to move in unison therewith from a neutral position corresponding to the neutral position of said second actuating member to a maximum position corresponding to the maximum ratio of transmission.

11. In a control system for an airplane including wing ailerons and a rudder: a main actuating member operable in either direction from a neutral position, between said actuating member and said ailerons a transmission establishing an univocal correspondence between the positions of said actuating member and the positions of the ailerons, second transmission means between said main actuating member and the rudder comprising a rigid movable transmission element adapted according to its position to introduce a variable ratio variable from a zero value, a control member operable in a single direction from its neutral position, third transmission means from said control member to said variable ratio transmission element establishing an univocal correspondence between the positions of said member and the positions of said variable ratio transmission element, the neutral position of said control member corresponding to the zero-ratio position of the variable ratio transmission element.

ROGER AIMÉ ROBERT.

REFERENCES CITED

The following references are of record in the file of this patent:

UNITED STATES PATENTS

| Number | Name | Date |
|---|---|---|
| 1,190,374 | Capdevila | July 11, 1916 |
| 2,082,172 | Mignet | June 1, 1937 |
| 2,228,311 | Gwinn | Jan. 14, 1941 |
| 2,246,203 | De Florez | July 17, 1941 |
| 2,318,833 | Stambach | May 11, 1943 |
| 2,355,026 | Koppen | Aug. 1, 1944 |

FOREIGN PATENTS

| Number | Country | Date |
|---|---|---|
| 323,881 | Germany | Aug. 11, 1920 |